United States Patent [19]

Caporiccio et al.

[11] Patent Number: 4,500,739

[45] Date of Patent: Feb. 19, 1985

[54] PROCESS FOR THE INSERTION OF PERFLUOROOLEFINES ON PERFLUOROPOLYETHERS AND CORRESPONDING PRODUCTS

[75] Inventors: Gerardo Caporiccio, Milan; Gian T. Viola, Paullo; Costante Corti, Milan, all of Italy

[73] Assignee: Montedison S.p.A., Milan, Italy

[21] Appl. No.: 476,518

[22] Filed: Mar. 18, 1983

[30] Foreign Application Priority Data

Mar. 19, 1982 [IT] Italy ................... 20270 A/82

[51] Int. Cl.$^3$ .............. C07C 43/12; C07C 41/01; C07C 55/40
[52] U.S. Cl. .................. 568/677; 204/158 R; 260/544 F
[58] Field of Search ............. 568/677; 260/544 F

[56] References Cited

U.S. PATENT DOCUMENTS

| | | | |
|---|---|---|---|
| 3,513,203 | 5/1970 | Sianesi et al. | 260/544 F |
| 3,574,770 | 4/1971 | Paine | 568/677 |
| 3,637,868 | 1/1972 | Nychka | 568/677 |
| 3,650,928 | 3/1972 | Sianesi et al. | 260/544 F |
| 3,665,041 | 5/1972 | Sianesi et al. | 260/544 F |
| 3,733,349 | 5/1973 | Loudas et al. | 568/677 |
| 4,094,911 | 6/1978 | Mitsch et al. | 568/677 |
| 4,113,435 | 9/1978 | Lagow et al. | 568/677 |

*Primary Examiner*—J. E. Evans

[57] ABSTRACT

Perfluoropolyether comprising, besides —$CF_2$— and —$CF_2F_4$ units, also a third fluoroalkylene unit containing three or more carbon atoms, said units being connected to each other through —O-ether bridges, and process for obtaining above said polyether, consisting in reacting a mixture of polyperoxidic perfluoropolyether and a fluorinated olefin, in the presence of U.V. radiations.

3 Claims, No Drawings

PROCESS FOR THE INSERTION OF PERFLUOROOLEFINES ON PERFLUOROPOLYETHERS AND CORRESPONDING PRODUCTS

THE PRIOR ART

It is known, from U.S. Pat. Nos. 3,665,041 and 3,847,978, that the polyperoxidic perfluoropolyethers:

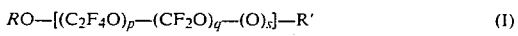

$$RO-[(C_2F_4O)_p-(CF_2O)_q-(O)_s]-R' \qquad (I)$$

wherein: R and R', either equal to or different from each other, may be: $-CF_3$, $-COF$, $-CF_2-COF$, p, q and s are comprised between 300 and 20,000, p/q is comprised between 0.2 and 25, are obtained by photo-oxidation of the perfluoroethylene. This polyperoxide may be reduced to a polyester devoid of peroxidic oxygen atoms, through a thermal or heat treatment at a temperature comprised between 150° and 250° C., or subjecting the pure polyperoxide as such or dissolved in a solvent, to irradiation with mercury-vapor lamps.

In this second phase, when the precursor (I) has a high content in peroxidic oxygen atoms, there takes place a molecular degradation and a loss in weight, so much the more notable the greater the content in peroxidic oxygen atoms: the degradation of the molecular weight and the loss in weight are, moreover, so much the greater the greater the content in the chain of the oxyperfluoromethylenic units that are capable of progressive fissions (chain fissions), known as β-fission processes.

THE PRESENT INVENTION

The present invention concerns a new process for the obtention of perfluoroethers which is devoid of the above said drawbacks, said perfluoroethers having in the polymeric chain at least three different alkylene units linked to each other through etheric bridges and arranged by a "random" distribution along the polymeric chain; two of these units, consisting of $-CF_2-$ and $-C_2F_4$, are those resulting from the photo-oxidation process of $C_2F_4$ and were pre-existing in the structure of the peroxidic precursor, while the third alkylene unit is introduced into the chain according to the present process and consists of three or more carbon atoms.

Said new unit is inserted in place of the peroxidic bridges and alternates itself with the other pre-existing oxyperfluoroalkylene units thereby forming a polyetheric structure. The starting product of the present invention is a polyperoxidic perfluoropolyether with a structure corresponding to formula (I) wherein the sum p+q is comprised between 300 and 20,000, but preferably between 300 and 15,000 the ratio s/p+q ranges from 0.05 to 0.5, but preferably is comprised between 0.05 and 0.25.

Said starting product may be obtained according to the photo-oxidation process carried out in a cylindrical reactor provided with a series of concentrical sheaths of transparent quartz, realized in such a way that in the central sheath there is placed a medium-pressure mercury-vapor lamp of the Hanau TQ 150 type (150 W), while in the interspace with the adjacent sheath there circulates an aqueous solution containing up to 2% of $CuSO_4$, and in the outer interspace there circulates a flow of nitrogen.

Into the reactor are condensed and kept at temperatures comprised between −60° C. and −35° C., 1000 grams of difluorodichloromethane.

After ignition of the mercury-vapor lamp inside the sheath system described above, there was bubbled through a mixture of oxygen and tetrafluoroethylene in a $O_2/C_2F_4$ ratio comprised between 2 and 1, with a flow rate of up to 80 lt/hr.

From the radiations coming from the mercury-vapor lamp, filtered by the $CuSO_4$ solution, are gradually eliminated, as the concentration of the $CuSO_4$ rises up to 2%, the radiations with a wave length below 280 mm. In this way the radiations thus selected promote the formation of a product with a greater peroxide content and a greater molecular weight.

After five hours of irradiation under above indicated conditions, there will be obtained a solution containing up to 25% by weight of a polyetherperoxidic oil that is characterized by iodometrical titration, N.M.R. analysis and viscosity.

The polyperoxidic perfluoropolyether percursors are made to react at temperatures comprised between −50° and +50° C., in the presence or absence of fluorinated or chlorofluorinated solvents liquid at these temperatures, in the absence of either air or molecular oxygen, with suitable olefins introduced into the mixture in the gaseous form or in the liquid state.

The mixture of reactants is then subjected to irradiation with ultraviolet rays in the field comprised between 240 and 360 mm, emitted by a Hanau TQ 150 type lamp with the mercury vapors at medium pressure.

Said process, conventionally called re-irradiation process, leads to the elimination of the −O−O− group, according to a reaction scheme in which the scission of the peroxidic bond is followed by an insertion reaction of the olefin at a competitive speed with respect to the degradive β-scission reactions.

The solvents best suited for the process are chosen out of the group of the perfluoroalkanes and of the perfluoropolyethers, perfluoroethane, perfluorocyclobutane, perfluorodimethylcyclobutane and perfluoropropylpyrane.

The fluoroolefins that, according to said photochemical process, turn out to be the most suited and preferable for the reaction with the polyperoxidic precursor, have all of them the characteristic of not homopolymerizing according to a radicalic mechanism in the presence of peroxide or of U.V. radiation (group I) or of homopolymerizing with difficulty (group II).

Examples of preferred fluoroolefins of the I group are: hexafluoropropene, 1-hydropentafluoropropene-1, 2-hydropentafluoropropene-1, perfluoromethylvinylether, perfluoropropylvinylether, 4-trifluoromethyl-3,6-dioxaperfluoroheptane-1, 6-dioxyperfluoroheptene-1; examples of fluoroolefins of Group II are: cycloperfluorobutene, perfluorobutadiene, trifluorobromoethylene.

Said olephines react, under the described conditions, with the radicals of the perfluoroalkoxidic type, generated by the fission of the peroxidic −O−O− bond, or they react with the radicals of the perfluoroalkylenic type coming from the immediate metathesis of perfluoroalkoxidic radicals through the β-scission mechanism.

In the global reaction, the perfluoroolefin turns out to insert itself into the polymeric chain at the site of the peroxidic bond through the described starting reactions and the end reactions for the coupling between the radicals, having a high degree of competitivness with respect to the fission reaction of the chain.

For instance, a peroxidic type I precursor, coming from the photooxidation of $C_2F_4$, as previously herein described, with a molecular weight (MW) of $1,10.10^6$ and a content in active oxygen of 4 g/100 g of product, and from which had been removed any trace of dissolved molecular oxygen, was subjected to a reirradiation treatment with a Hg-vapor lamp of the Hanau TQ 150 type, at low temperature, in the presence of hexafluoropropene, thereby obtaining a new polyether where, in the site of the preexisting peroxidic —O—O— group, through the sequence of the described reactions, there has taken place the insertion with the formation of structures, prevailingly of the type:

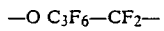

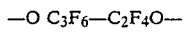

wherein $C_3F_6$ represents unit $-CF_2-CF(CF_3)-$ and $C_2F_4$ represents unit $-CF_2CF_2$.

According to the preferred process of this invention, the peroxidic perfluoropolyetheric precursor is dissolved in an excess of fluoroolefin so as to form a 30–50% solution; the mixture thus obtained is then cooled down to a temperature comprised between $-40°$ C. and $0°$ C., after which it is then subjected, through a quartz sheath or window, to irradiation with a medium-pressure Hg-vapor lamp.

The reaction is then carried on up to the total disappearance of the peroxidic bridges, while the resulting polyether is recovered through evaporation and distillation of the fluoroolefin. It will be observed that the reaction did not cause any loss in weight of the starting peroxide.

On the reaction product, by means of chemical and structural (NMR) analyses, there is then checked the disappearance of the peroxidic oxygen and the appearance of new perfluoroalkylenic units which confer to the product itself a new structure that is new with respect to that of the starting perfluoropolyetheropolyperoxidic precursor. Moreover, there is also determined the viscosity of 30,000 c.St (at 20° C.) and the M.W., on the basis of a gel permeation chromatography test, found to amount to 270,000. Since from the NMR analysis it turns out that the p/q ratio is equal to 0.8, it obtains that from each starting peroxidic chain, in the average, there have been formed 4 chains.

The products obtained according to the re-irradiation process consist of perfluoropolyetheric chains having chain terminals of the neutral type (such as $-CF_3$) or of the acid type (such as $-CF_2-COF$), coming from the peroxidic precursors of structure I.

The acid terminals, of the carbonylfluoride, may be transformed into neutral terminals according to two processes:

(a) by fluorination at high temperature (150°–240° C.);

(b) by alkaline hydrolysis with KOH at 5% in the presence of ethylene glycol at 180° C.

The new neutral groups are of the type: $-C_2F_5$, $-CF_3$, in the case of the first process, or of the type $-CF_2H$ in the case of the second.

Fluorination process (a) is the preferred one for obtaining neutral perfluoropolyethers, in the case in which the re-irradiation process of the peroxidic precursor has been made with fluoroolephines belonging to group 1.

The acid terminals may also be transformed into different terminal groups such as into esteric, amidic, methylolic groups, with the methods described in, for instance, U.S. Pat. Nos. 3,847,978, 3,864,318 and 3,876,617.

The advantages of the present process of re-irradiation of the peroxidic precursor with fluoroolefins are:

(1) the obtention of non-peroxidic perfluoropolyethere containing $-C_2F_4O-$ and $-CF_2O-$ units of a high molecular weight, greater than that obtainable with the processes known previously (thermal reduction or photochemical reduction in the absence of olefin);

(2) minimization or elimination of the molecular degrading of the starting chain giving gaseous products;

(3) obtention of end products, after the elimination of the terminal acids through the treatment with fluorine, proving to be more stable to heat than is possible to obtain by means of the known processes.

The perfluoropolyethers obtained according to the present invention and having neutral terminals, find a useful application as hydraulic fluids of high viscosity, such as heat-exchanging liquids with a very high chemical and thermal stability. Still another application of perfluoropolyethers with a high molecular weight obtainable according to this invention, is that of additives for fluorinated elastomers with the aim of improving the processability (workability) of the latter.

In the case of re-irradiation process of the peroxidic precursor is achieved with a fluoroolefin of Group II, having two double bonds, like in the case of perfluorobutadiene, or a reactive group like the bromine atom of bromotrifluoroethylene, the end products have, after the re-irradiation, reactive points in the perfluoropolyetheric chain (such as the double bond or the bromine atom) which may be suitably dosed in their concentration, starting from the peroxidic oxygen content in the starting peroxide, and may be utilized as reactive points for realizing cross-netting reactions amongst the linear chains or grafting reactions of other olefins, or clinching on other polymeric substrates or on other materials.

EXAMPLE 1

Into a cylindrical 900 cc glass reactor of 100 mm diameter, provided with a three-sheaths system of coaxial quartz-sheaths respectively of 22, 40 and 60 mm diameter, of a drafting pipe for the introduction of the gases, and fitted with a condenser thermo-stabilized at $-80°$ C., there were introduced 1100 grams of dichlorodifluoromethane.

Inside the 22 mm ∅ sheath there was placed a medium-pressurized mercury-vapor lamp of the Hanau TQ 150 type of 150 W; while in the interspace between the 25 mm sheath and the 40 mm sheath there was made to circulate a solution containing 0.5% of $CuSO_4$ in order to cool the burner and eliminate the radiation of wave length below 260 mm.

Within the interspace between the 40 mm ∅ sheath and that of 60 mm ∅, there was made to circulate nitrogen.

Through the drafting pipe were fed into the reactor, over a period of time of 5 (five) hours, 120 liters of $C_2F_4$ and 200 liters of oxygen, maintaining the temperature of the reaction mixture at $-35°$ C.

At the end of 5 hours, the mercury-vapor lamp was switched off and the solvent was allowed to evaporate from the reactor, facilitating its removal by means of a weak nitrogen current; thereby were gathered 210 grams of a polymeric liquid that had remained as a residue.

By iodometric analysis there was ascertained a peroxidic oxygen content of 1.8 grams/100 g of polymeric oil.

The NMR analysis showed that the polymeric product consisted of polyetheric chains containing units of the $CF_2O$ and of the $-CF_2CF_2O-$ type, statistically spaced with $-CF_2OO-$ and $-CF_2CF_2OO-$ units in such quantities that the total ratio $C_2/C_1$ equals 1.3.

Because of the high molecular weight the terminals were not detactable by the NMR analysis wherefore it is not possible to evaluate in this way the molecular weight.

The viscosity of the product determined by means of a Brookfield viscosimeter turned out to be equal to $10^5$ c.St., a value which, on the basis of a preceding calibration, allows one to calculate a molecular weight of 570,000 corresponding to 6050 units in the chain.

100 g of the product thus prepared and isolated in the pure state, were placed into a reactor like that described previously herein above, and, while maintaining a moderate nitrogen current, in the reactor maintained at $-40°$ C., there were condensed 400 g of perfluoropropene.

After all the polymeric oil was dissolved in the olefin, into the system of sheaths, refrigerated with distilled water, there was introduced a medium-pressurized, 150 W mercury-vapor lamp. After 8 hours of irradiation, the lamp was turned off and the unreacted perfluoropropene was evaporated. There were thus gathered 105 g of a polymeric oil that did not show, at the iodometric analysis, any content of peroxydic oxygen.

The viscosity, evaluated by means of the capillary viscosimeter, proved to amount to 17,000 c.St, corresponding to a molecular weight of 190,000.

The NMR analysis, besides the normal structure of a non-peroxydic polyether, showed the appearance of new bands which have been attributed to new units containing 4 or more carbon atoms.

The product was then quantitatively transferred into a three-necked flask fitted with a stirrer, a condenser and a drawing pipe through which was made to pass a mixture of fluorine and nitrogen in a fluorine/nitrogen ratio of 1:1 and at a flow rate of 10 lt/hr. The temperature from 150° C. was gradually brought up to 240° C. in 2 hours. The fluorination was then continued for a total of 10 hours, thereby obtaining 85 g of a neutral product with a viscosity of 16,000 c.St., corresponding to a m.w. of 180,000.

On this product was then carried out the evaluation of the viscosity index through the viscosity values at 37.8° C. and at 98.9° C., respectively corresponding to 8000 and 1200 c.St.

The stability to thermal oxidation was tested for 24 hours at 250° C., in the presence of a Ti—Al—V alloy and an air current flowing at the rate of 1 lt/hr, but no variation neither with respect to the loss of weight nor with regard to the viscosity and acidity characteristics of the product were detected.

COMPARATIVE EXAMPLE 1A 50 grams of the starting peroxidic product in the pure state were placed inside a quartz vial and were then irradiated at room temperature using a medium-pressurized, 150 W mercury-vapor lamp placed outside the vial.

After 15 hours of irradiation, there were gathered 41.5 g of a polymeric oil having a content in peroxidic substance that was not detectable while the viscosity amounted to 1150 c.St, corresponding to a molecular weight of 36,000 equal to 450 units per chain.

The fluorination of the product thus obtained according to the procedures previously above described, yielded 38 g of a neutralized polymeric oil showing a viscosity of 1000 c.St corresponding to a molecular weight of 34,000 equal to 390 units in the chain (p/q=0.78).

COMPARATIVE EXAMPLE 1B 50 g of the starting peroxidic product were transferred into a flask provided with a stirrer, a condenser and a drawing pipe through which was made to circulate a slight flow of nitrogen.

The oil was heated up to 240° C. according to the following heating cycle: 140° C. (for 2 hrs.), 160° C. (2 hrs.), 180° C. (2 hrs.), 200° C. (2 hrs.) and 240° C. (for 8 hours).

At the end of the treatment there were gathered 35.6 grams of non-peroxidic oil having a viscosity of 950 c.St corresponding to a molecular weight of 32,000 (400 units/chain).

The fluorination of the product thus prepared according to the already previously herein above described procedures, yielded 30.1 g of a polyether with a viscosity of 940 c.St corresponding to a m.w. of 32,000 (equal to 400 units per chain).

EXAMPLE 2

Using the same equipment as in example 1 and operating in the same way, while letting circulate in the refrigerating sheath a 1% solution of $CuSO_4$, into the reactor there were fed in, during a period of 5 hours, 140 lt of $C_2F_4$ and 200 lt of oxygen, the reactor temperature being maintained at $-45°$ C. At the end of the reaction, after evaporation of the solvent, there were gathered 221 g of a polymeric liquid having a content of active oxygen equal to 3.1 g per 100 g of oil.

The viscosity, determined by means of a Brookfield viscosimeter, proved to amount to $1.3 \times 10^5$ c.St, corresponding to a molecular weight of 800,000 (8420 units) while the $C_2/C_1$ units, determined through the NMR analysis, amounted to 1.3.

Operating according to the procedures described in example 1, 100 g of the preceding product were transferred into a second reactor and on this product were condensed 400 g of perfluoropropylene.

The mixture was then irradiated for 8 hours at a temperature of $-30°$ C. Once the photochemical reduction reaction was achieved, there were gathered 105 grams of a polymeric product whose peroxidic content proved null. The viscosity of the product, determined by a capillary viscosimeter proved to amount to 26,000 c.St which corresponds to a m.w. of 250,000 (equal to 2810 units/chain).

The $C_2/C_1$ unit ratio, determined by the NMR analysis, was equal to 0.8.

COMPARATIVE EXAMPLE 100 grams of the same peroxidic product were reduced by thermal means, operating in the same way as that illustrated in example 1B.

At the end of the reaction there were gathered 58 g of a non-peroxidic oil showing a viscosity of 550 c.St, corresponding to a molecular weight of 18,900 (equal to 220 units per chain) and in a ratio p/q=0.6.

EXAMPLE 3

Using the previously described equipment, for the cooling of the mercury lamp was used a 2% solution of $CuSo_4$. Using this concentration it proved possible to eliminate the U.V. radiation with a wave length below 280 mm.

During 5 hours, and maintaining the reaction mixture temperature at −40° C., into the reactor were fed 80 liters of $C_2F_4$ and 160 liters of oxygen. At the end of the reaction there were gathered 120 grams of a very viscous polymeric product which at the iodometric analysis showed a content in peroxidic oxygen of 4.1 g/100 g of product and a viscosity of $3 \times 10^5$ C.St. equal to a molecular weight of $1,1 \times 10^6$. The NMR analysis showed a $C_2:C_1$ ratio=2.1.

60 g of the product thus obtained were dissolved, according to the same procedures as those described in ex. 1, in 400 g of $C_3F_6$ and irradiated, using the whole spectrum of the water-cooled, medium-pressurized mercury-vapor lamp.

After 8 hours of irradiation, and after evaporation of perfluoropropene, there were obtained 67 g of a non-peroxidic polymeric product having a viscosity of 30,000 c.St and a $C_2/C_1$ ratio, determined by means of NMR spectrometry, equal to 0.8.

There resulted a m.w. of 270,000 and a number of units per chain equal to 3050.

The product quantitatively transferred into a three-necked flask, was fluorinated according to the procedures reported in example 1. Thereby were obtained 58 g of a neutral product having a viscosity of 28,000 c.St corresponding to a molecular weight of 260,000.

COMPARATIVE EXAMPLE

The remaining 60 grams of peroxidic product of the preceding preparation were subjected to thermal reduction according to the procedures reported in example 1.

There were obtained 25 grams of a product with a low viscosity of 90 c.St and with a $C_2/C_1$ ratio=0.3, a molecular weight equal to 7700 corresponding to 100 units/chain.

EXAMPLE 4

160 g of a polyperoxidic polyether with a content peroxidic oxygen equal to 0.8 g of active oxygen/100 g of product and with a viscosity of 1100 c.St equal to a molecular weight of 3500 dissolved in 400 grams of perfluorocyclopyrane were irradiated, in a sheath-reactor complex similar to that described in example 1, over 4 hours.

During the photochemical reduction the reactor was fed through the special drawing pine 2.5 lt of perfluorobutadiene. After evaporation under vacuum of the solvent, there were gathered 162 g of a product whose content in peroxidic product equalled zero. The viscosity amounted to 1250 c.St.

A solution in $CF_2Cl-CFCl_2$ of the oil thus prepared, additioned bromine thus showing the existence in the molecule of double bonds. Moreover, the infrared spectrum at 1780 cm$^{-1}$ showed the typical frequency of the double bond.

50 g of the above prepared perfluoropolyether product, dissolved in a $CF_2Cl-CFCl_2$, were oxidated treating them at 40° C. for 5 hours with permanganate diluted in acetone. After elimination of the solvent and washing with acetone, there was added to the product a methanolic solution containing 3.5 g of hexamethylenediamine which was maintained for 2 hours at 50° C. In this way there was caused the formation of a gel insoluble in $CF_2Cl-CFCl_2$.

The infrared analysis showed the presence of a carbonyl group at 6.8 microns, characteristical of amidic bonds. From this can be inferred that the hexamethylendiamine had cross-linked the perfluoropolyether.

EXAMPLE 5

Using the same equipment and procedures previously described, 100 g of a polyperoxidic polyether, with a content of peroxidic product of 0.8 g of active oxygen every 100 g of product and a viscosity of 1100 c.St were dissolved in 400 g of trifluorobromoethylene, maintaining the mixture of the reactants at −45° C.

The solution was then irradiated with a Hanau TQ 150 type mercury-vapor lamp, for a period of 4 hours. There were obtained, after evaporation of the solvent, 95 grams of a non-peroxidic oil having a viscosity of 550 c.St (m.w. equal to 23,000).

The percent analysis showed a content in Br equal to 1.8% by weight. On the basis of the viscosimetric molecular weight of 23,000, it can be calculated that each chain contained as an average 5 bromine atoms.

What we claim is:

1. Perfluoropolyether consisting of recurring —$CF_2$—, —$CF_2CF_2$— units and a third recurring at least partially fluorinated alkylenic unit containing at least three carbon atoms and comprising acid or neutral terminal groups selected from the group consisting of —$CF_3$, $C_2F_5$, —$CF_2H$, —COF and —$CF_2$—COF, said recurring —$CF_2$, —$CF_2CF_2$ and alkylenic units being joined to each other through oxygen atoms with etheric bonds, and being arranged in a random distribution along the polymeric chain.

2. Perfluoropolyether according to claim 1, characterized in that the sum of the —$CF_2$— and —$CF_2CF_2$— units is comprised between 300 and 20,000.

3. Perfluoropolyether according to claim 1, characterized in that the numerical ratio between th fluoroalkylenic units with at least carbon atoms and the sum of the —$CF_2$— and —$CF_2CF_2$— units is comprised between 0.05 and 0.25.

* * * * *